United States Patent
Matsuda et al.

(10) Patent No.: US 6,682,373 B2
(45) Date of Patent: Jan. 27, 2004

(54) PUMP STRUCTURE OF JET-PROPULSION WATERCRAFT

(75) Inventors: Yoshimoto Matsuda, Kobe (JP); Takeru Oshima, Kobe (JP)

(73) Assignee: Kawasaki Jukogyo Kabushiki Kaisha, Kobe (JP)

(*) Notice: Subject to any disclaimer, the term of this patent is extended or adjusted under 35 U.S.C. 154(b) by 0 days.

(21) Appl. No.: 10/255,267

(22) Filed: Sep. 25, 2002

(65) Prior Publication Data

US 2003/0064639 A1 Apr. 3, 2003

(30) Foreign Application Priority Data

Oct. 3, 2001 (JP) ........................ 2001-307303

(51) Int. Cl.$^7$ ............................................ B63H 11/08
(52) U.S. Cl. ............................................ 440/38
(58) Field of Search ........................................ 440/38

(56) References Cited

U.S. PATENT DOCUMENTS 6,383,040 B2 * 5/2002 Ito et al. .................... 440/38

FOREIGN PATENT DOCUMENTS

JP          05139380 A  *  6/1993  .......... B63H/11/08

* cited by examiner

Primary Examiner—Jesus D. Sotelo
(74) Attorney, Agent, or Firm—Kolisch Hartwell, P.C.

(57) ABSTRACT

Disclosed is a pump structure of a jet-propulsion watercraft capable of preventing an increase in frictional resistance between a sleeve and an impeller. There is provided a pump structure of a jet-propulsion watercraft adapted to eject water pressurized and accelerated by a water jet pump driven by the engine from an outlet port so as to be propelled as the resulting reaction, the water jet pump comprising a cylindrical pump casing, an impeller supported coaxially in the pump casing and rotatably driven by the engine, and a cylindrical sleeve made of a metal different from a metal of the pump casing, wherein an annular layer made of a material that decreases electrolytic corrosion or oxidation of the pump casing or the sleeve is formed between the pump casing and the sleeve.

10 Claims, 5 Drawing Sheets

PUMP STRUCTURE OF JET-PROPULSION WATERCRAFT

BACKGROUND OF THE INVENTION

The present invention relates to a jet-propulsion watercraft which rearwardly ejects water pressurized and accelerated by a water jet pump and planes on a water surface as the resulting reaction. More particularly, the present invention relates to an improved structure of the water jet pump.

In recent years, so-called jet-propulsion personal watercraft (PWC) have been widely used in leisure, sport, rescue activities, and the like. The personal watercraft is configured to have a water jet pump driven by an engine, for pressurizing and accelerating water sucked from a water intake generally provided on a hull bottom surface and ejecting it rearward from an outlet port. Thereby, the personal watercraft is propelled.

The water jet pump is mainly comprised of a cylindrical pump casing and an impeller supported coaxially in the pump casing and rotatably driven by the engine. In general, the pump casing is made of aluminum alloy for weight saving and the impeller is made of stainless steel highly resistant to cavitations. For this reason, a cylindrical sleeve made of stainless steel resistant to wear is fitted tightly into an inner peripheral face of the pump casing along which the hard impeller slides, thereby reducing wear which is caused by the impeller.

However, since the sleeve is made of stainless steel equal in hardness to the stainless steel of the impeller, the pump casing made of aluminum alloy having an ionization tendency greater than that of the stainless steel tends to electrolytically corrode, i.e., oxidize, especially when the personal watercraft is in contact with water. Further, with use, the oxidation of the pump casing is progressed and thereby the pump casing has an increased volume or is expanded. As a result, the pump casing inwardly pushes the sleeve, thereby causing an increase in frictional resistance between the sleeve and the impeller, which leads to their wear. This wear may reduce the lives of parts of the watercraft as well as generates sliding noises.

SUMMARY OF THE INVENTION

The present invention addresses the above-described condition, and an object of the preset invention is to provide a pump structure of a jet-propulsion watercraft capable of preventing an increase in frictional resistance between a sleeve and an impeller by forming an additional layer made of a material that prevents electrolytic corrosion or oxidation between a pump casing and the sleeve, which are made of different metals.

In accordance with the present invention, there is provided a pump structure of a jet-propulsion watercraft adapted to eject water pressurized and accelerated by a water jet pump driven by an engine from an outlet port so as to be propelled as the resulting reaction, the water jet pump comprising a pump casing having a cylindrical inner peripheral face, and an impeller supported in the pump casing coaxially with the inner peripheral face of the pump casing and rotatably driven by the engine, and a cylindrical sleeve provided between the inner peripheral face of the pump casing and an outer periphery of the impeller and made of a metal different from a metal of the pump casing, wherein an annular layer made of a material that subdues electrolytic corrosion or oxidation of the pump casing or the sleeve is formed between the pump casing and the sleeve.

In accordance with the above invention, since the layer made of the material that subdues electrolytic corrosion or oxidation is formed between the pump casing and the sleeve, which are made of different metals, the increase in the frictional resistance between the sleeve and the impeller can be prevented, and consequently, their wear, and sliding noises and reduction of lives of parts caused by the wear can bedecreased.

With the above configuration, for example, when a setting is made such that the impeller is changed into another impeller with a different outer diameter, only changing the associated sleeve into another sleeve according to the outer diameter of the another impeller, is needed, but changing or processing the pump casing is not necessary. In this case, the thickness of the layer may be changed in accordance with the change of the outer diameter of the sleeve.

The annular layer may be made of a material having an ionization tendency more than that of the pump casing or the sleeve, or otherwise a non-conductive material.

When aluminum alloy is used for the pump casing and stainless steel is used for the sleeve, the annular layer may be made of a metal having an ionization tendency more than that of an aluminum alloy having an ionization tendency more than that of stainless steel, for example, magnesium alloy. Alternatively, the annular layer may be made of a metal having an ionization tendency more than that of the pump casing made of at least an aluminum alloy, for example, zinc alloy. As the aluminum alloy, an aluminum alloy having an ionization tendency less than that of zinc is preferably used. Thereby, the above-mentioned inward expansion of the pump casing can be subdued. Therefore, the inward push against the sleeve and the resulting increase in the frictional resistance between the sleeve and the impeller can be subdued.

As a matter of course, other than metal such as magnesium alloy and zinc alloy, electrically insulating materials, for example, synthetic resin, which substantially impedes ion exchange between the pump casing and the sleeve, may be used as the annular layer. Thus, the use of a plastic material such as resin for the annular layer allows interference between the sleeve and the impeller to be absorbed by elastic deformation of the annular layer. This makes it easy to keep a clearance between the sleeve and the impeller.

When resin is used for the annular layer, powdered metal having an ionization tendency which is, for example, at least more than that of the material of the pump casing, may be mixed with the resin.

The annular layer may be coated over the surface (e.g., outer peripheral face) of the sleeve, which is smaller in size and easier to process than the pump casing, by a process method such as coating or plating. However, if the pump casing is coated, the pump casing can be coated over the inner peripheral face thereof by a similar process method.

The annular layer may coated over an end face of the sleeve, in particular, on the side of the sleeve fitted into the pump casing, as well as the outer peripheral face of the sleeve, for isolating the pump casing from the sleeve. Thereby, the pump casing and the sleeve can be reliably insulated.

As a matter of course, the engine may be a two-cycle engine or a four-cycle engine.

The above and further objects and features of the invention will more fully be apparent from the following detailed description with accompanying drawings.

DETAILED DESCRIPTION OF THE PREFERRED EMBODIMENTS

The present invention will now be described in detail referring to the accompanying drawings illustrating the embodiment thereof.

Figure 1:
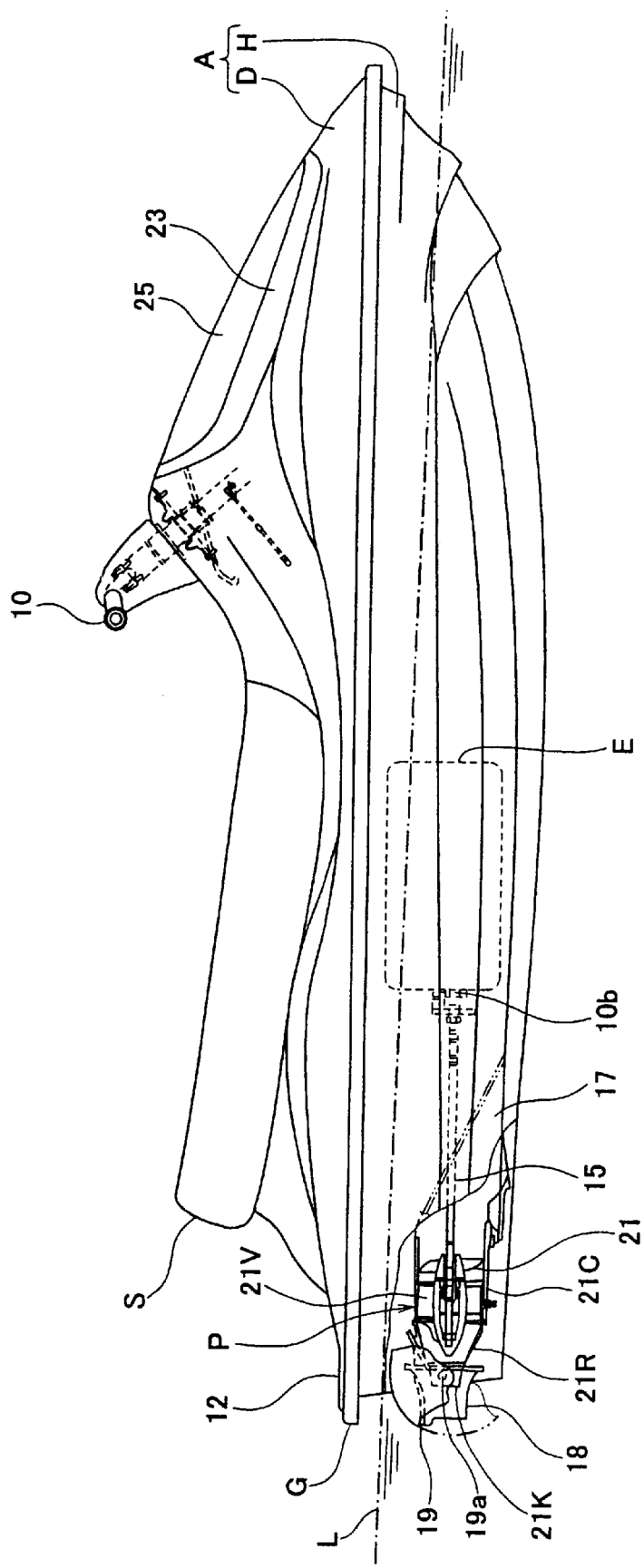
FIG. 1 is a side view showing an entire personal watercraft according to an embodiment of the present invention.
Figure 2:
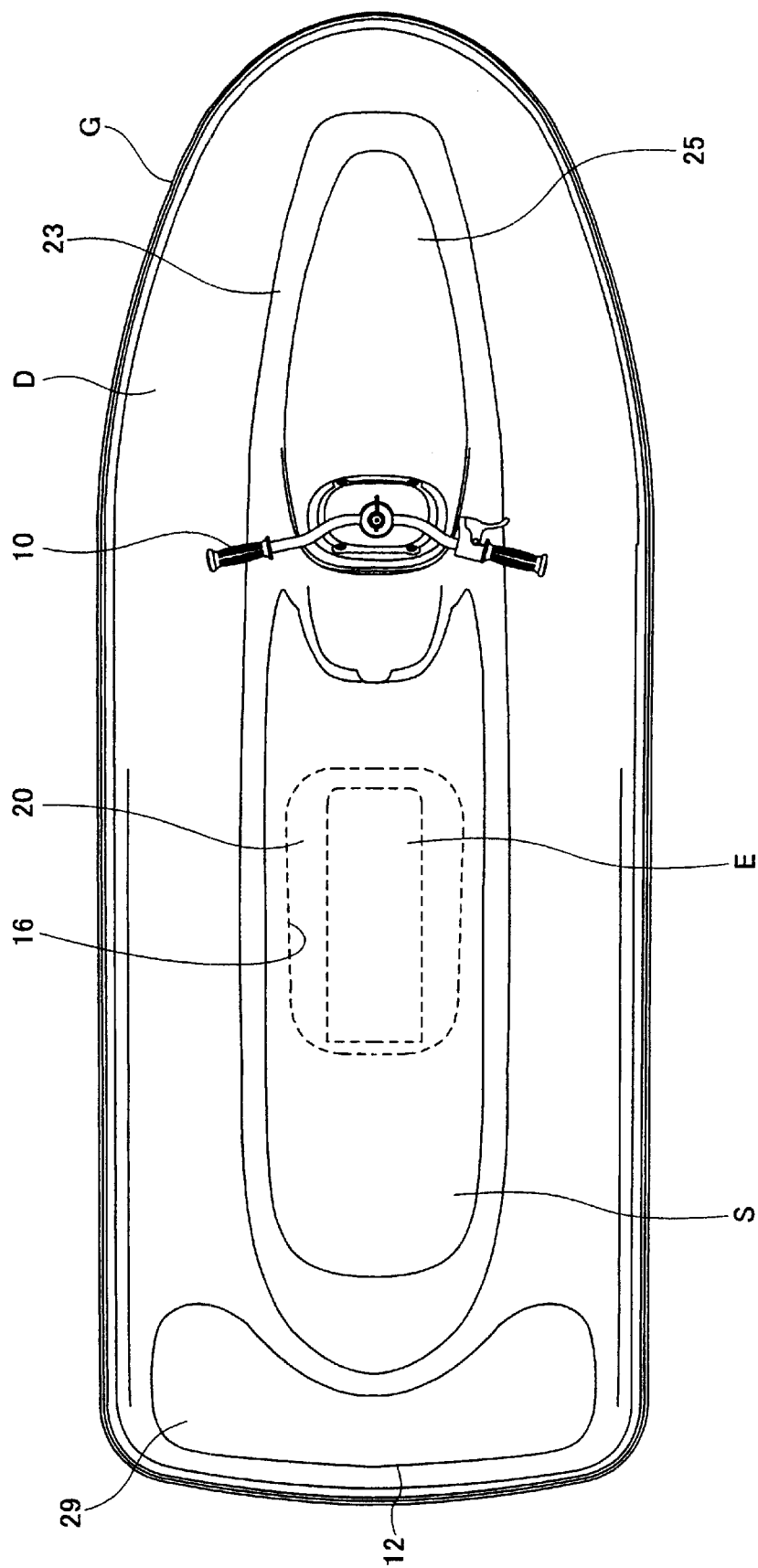
FIG. 2 is a plan view showing the entire personal watercraft in FIG. 1.

FIG. 1 is a right-side view showing an entire personal watercraft according to an embodiment of the present invention, and FIG. 2 is a plan view thereof. In FIGS. 1 and 2, reference numeral A denotes a body of the personal watercraft. The body A comprises a hull H and a deck D covering the hull H from above. A line at which the hull H and the deck D are connected over the entire perimeter thereof is called a gunnel line G. In this embodiment, the gunnel line G is located above a waterline L of the personal watercraft.

As shown in FIG. 2, an opening 16, which has a substantially rectangular shape seen from above, is formed at a relatively rear section of the deck D such that it extends in the longitudinal direction of the body A, and a riding seat S is mounted over the opening 16. An engine E is provided in a chamber (engine room) 20 surrounded by the hull H and the deck D below the seat S.

The engine E has multiple cylinders (e.g., three cylinders). As shown in FIG. 1, the engine E is mounted such that an output end 10b of a crankshaft is placed along the longitudinal (front and rear) direction of the body A. The output end 10b is rotatably coupled integrally with a pump shaft of a water jet pump P through a propeller shaft 15. An impeller 21 is attached on the pump shaft of the water jet pump P. The impeller 21 is covered with a pump casing 21C on the outer periphery thereof.

A water intake 17 is provided on the bottom of the hull H. The water is sucked from the water intake 17 and fed to the water jet pump P through a water intake passage. The water jet pump P pressurizes and accelerates the water and discharges the pressurized and accelerated water through a pump nozzle 21R having a cross-sectional area of flow gradually reduced rearward, and from an outlet port 21K provided on the rear end of the pump nozzle 21R, thereby obtaining a propulsion force. In FIG. 1, reference numeral 21V denotes fairing vanes for fairing water flow behind the impeller 21.

As shown in FIGS. 1 and 2, reference numeral 10 denotes a bar-type steering handle. The handle 10 operates in association with a steering nozzle 18 swingable around a swing shaft (not shown) to the right or to the left behind the pump nozzle 21R. When the rider rotates the handle 10 clockwise or counterclockwise, the steering nozzle 18 is swung toward the opposite direction so that the watercraft can be correspondingly turned to a steered direction while the water jet pump P is generating the propulsion force.

As shown in FIG. 1, a bowl-shaped reverse deflector 19 is provided above the rear side of the steering nozzle 18 such that it can swing downward around a horizontally mounted swinging shaft 19a. The deflector 19 is swung downward to a lower position behind the steering nozzle 18 to deflect the ejected water from the steering nozzle 18 forward and, as the resulting reaction, the personal watercraft moves rearward.

In FIGS. 1 and 2, reference numeral 12 denotes a rear deck. The rear deck 12 is provided with an openable rear hatch cover 29. A rear compartment (not shown) with a small capacity is provided under the rear hatch cover 29. In FIGS. 1 and 2, reference numeral 23 denotes a front hatch cover. A front compartment (not shown) is provided under the front hatch cover 23 for storing equipment and the like. Another hatch cover 25 is provided over the front hatch cover 23 forming a two-layer hatch cover. Life jackets or the like can be stored under the upper hatch cover 25 through an opening (not shown) provided in the rear end thereof.

Figure 3:
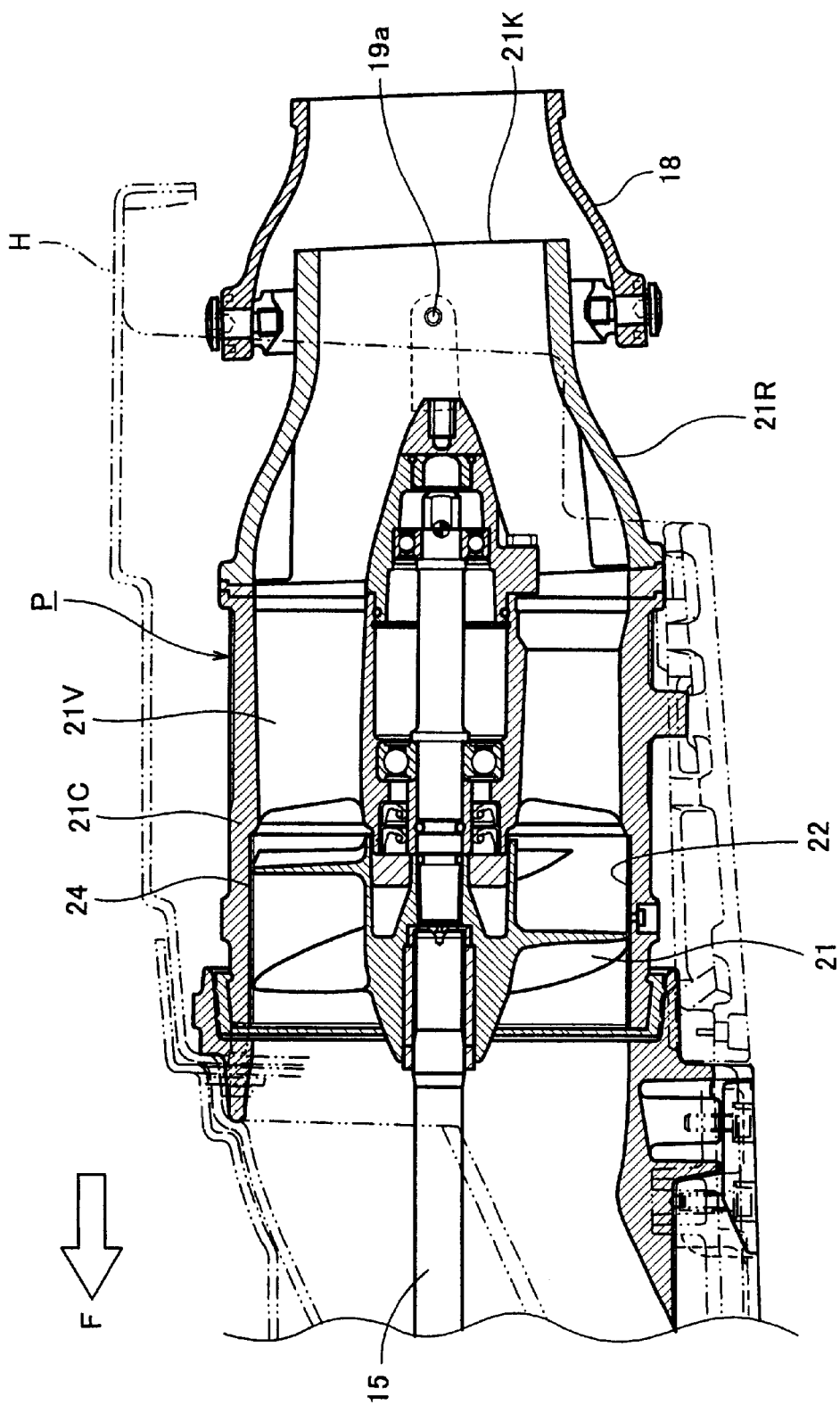
FIG. 3 is an enlarged view of the personal watercraft in FIG. 1, showing a pump structure of the personal watercraft according to the embodiment of the present invention.

FIG. 3 is an enlarged left side view of the personal watercraft in FIG. 1, showing a pump structure of the personal watercraft according to the embodiment of the present invention. For clarity, the front side of the watercraft is represented by both "F" and an arrow. In FIG. 3, the deflector 19 is not illustrated.

The pump casing 21C is made of aluminum alloy and substantially cylindrical. The stainless steel impeller 21 supported by the propeller shaft 15 as described above is internally mounted in a front half portion of the pump casing 21C. In this embodiment, the impeller 21 has a mixed flow or axial flow two-stage blade structure each stage of which is comprised of three blades.

A cylindrical sleeve 22 made of the material identical to that of the impeller 21 is internally fitted in the pump casing 21C at a position in the longitudinal direction of the watercraft, where the two-stage impeller 21 is provided. It is preferable that there is no gap between the tip end of the impeller 21 and the inner surface of the sleeve 22 for pumping efficiency. Nonetheless, the pumping efficiency is reduced due to sliding friction in the state in which the impeller 21 and the sleeve 22 are in contact with each other. Therefore, a proper gap is provided between the tip end of the impeller 21 and the inner face of the sleeve 22.

Figure 4:
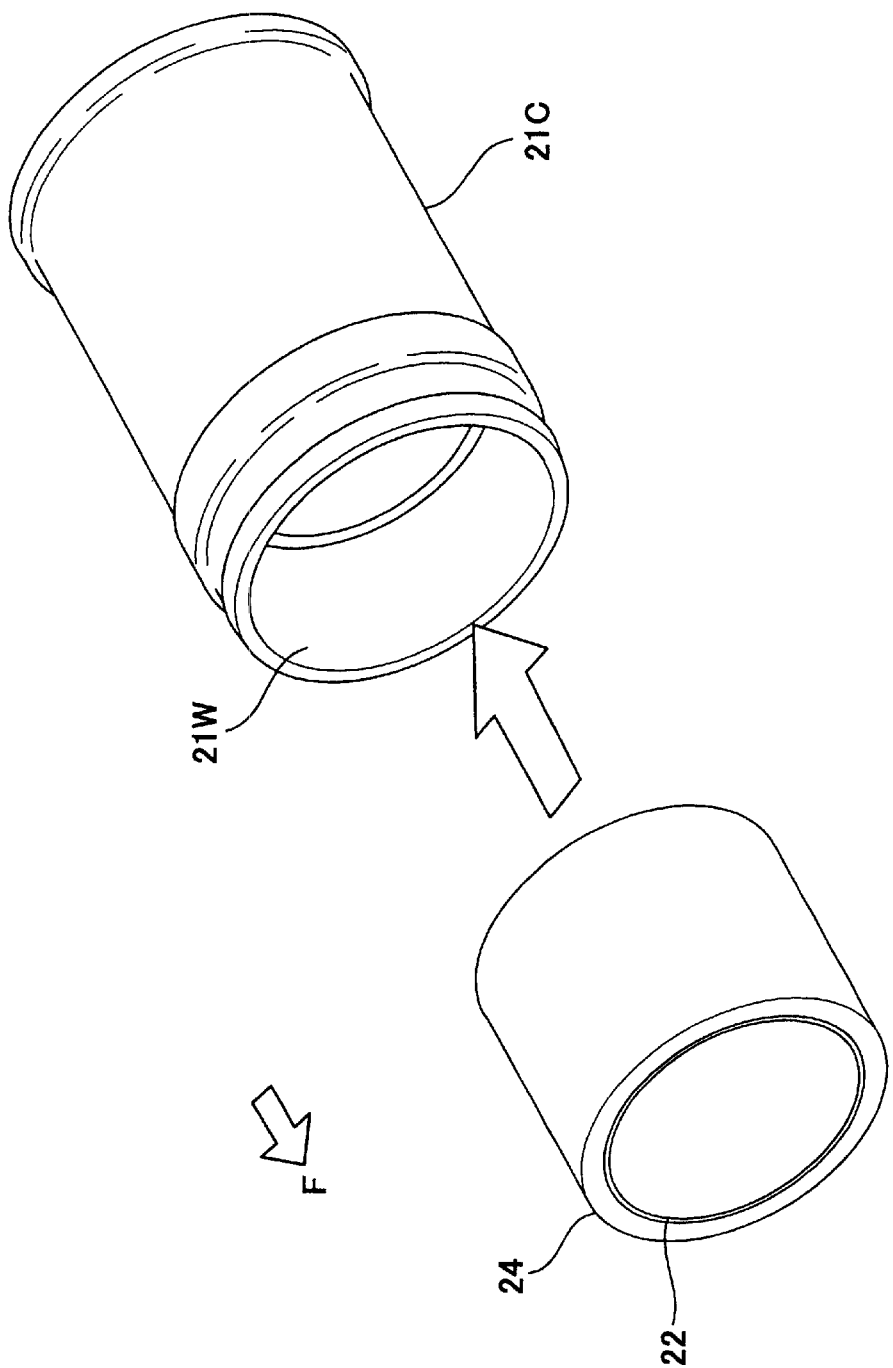
FIG. 4 is a perspective view showing a configuration of an annular layer formed in a sleeve in FIG. 3 and mounting of the sleeve into the pump casing.

As clearly shown in FIG. 4, an annular layer 24 having an adequate thickness is fixed over a surface (mainly, outer peripheral face) of the sleeve 22. The pump casing 21C and the sleeve 22 are made of different metals, and the annular layer 24 is made of a material that prevents electrolytic corrosion or oxidation between the pump casing 21C and the sleeve 22, for example, non-conductive material such as synthetic resin. The annular layer 24 may be made of a metal having ionization tendency more than that of the pump casing 21C or the sleeve 22, and more preferably a metal having ionization tendency more than that of the pump casing 21C. The annular layer 24 can be coated over the surface of the sleeve 22 by, for example, application or plating of the above-identified material that prevents electrolytic corrosion or oxidation.

The sleeve 22 with the annular layer 24 fixed over the outer peripheral face is fitted tightly into the inner peripheral portion of the pump casing 21C. To this end, an enlarged-diameter portion 21W with a step is provided at a position of the inner peripheral portion of the pump casing 21C where the impeller 21 is provided, in order to ensure the space for fitting the sleeve 22 into the pump casing 21C. In the present invention, the sleeve 22 is not necessarily fitted tightly into the pump casing 21C, but may be fixed in the pump casing 21C by an alternative method.

Figure 5:
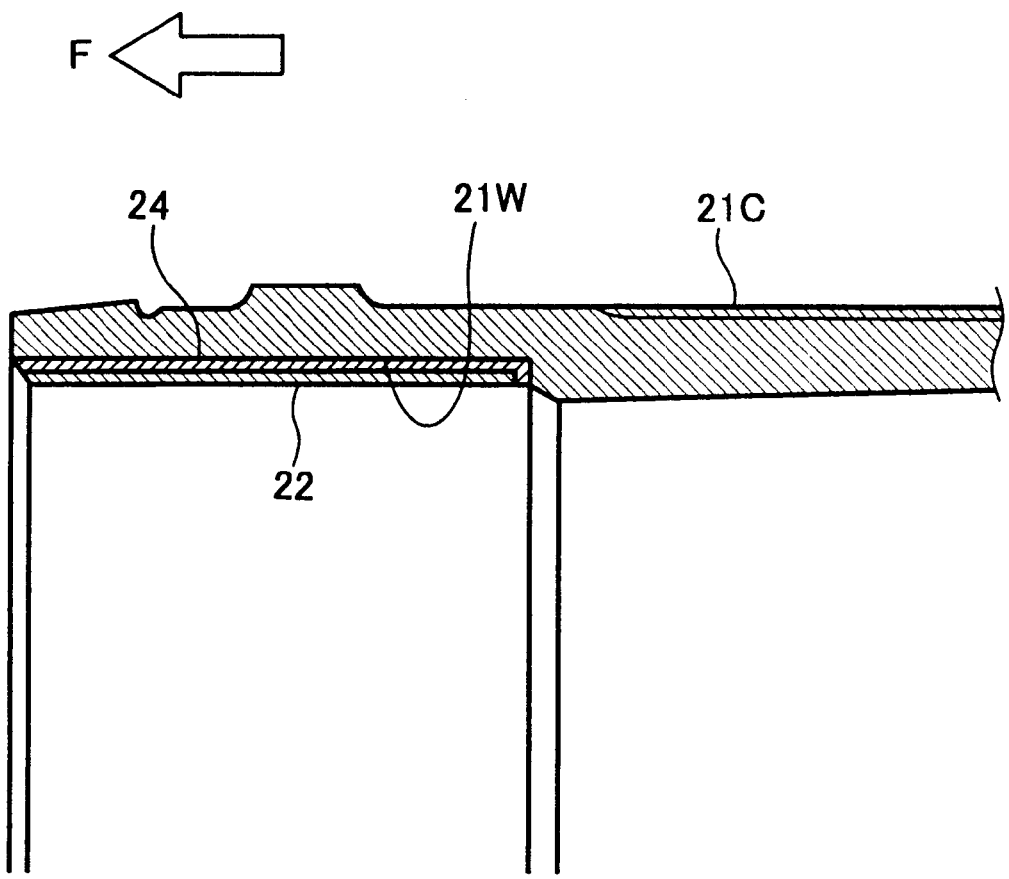
FIG. 5 is a cross-sectional view of FIG. 3, showing that the sleeve provided with the annular layer is mounted into the pump casing.

As shown in FIG. 5, the sleeve 22 fitted into the enlarged diameter portion 21W is isolated from the pump casing 21C by the annular layer 24. As a result, it is possible to prevent the electrolytic corrosion or oxidation of the pump casing 21C made of aluminum alloy having an ionization tendency more than that of stainless steel of the sleeve 22. As shown in FIG. 5, the annular layer 24 covers a rear end face of the sleeve 22 to prevent contact of the sleeve 22 with the pump casing 21C at a rear end of the enlarged-diameter portion 21W.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds thereof are therefore intended to be embraced by the claims.

What is claimed is:

1. A water jet pump of a jet-propulsion watercraft, comprising:
   a pump casing having a cylindrical inner peripheral face;
   an impeller supported in the pump casing coaxially with the inner peripheral face of the pump casing; and
   a cylindrical sleeve provided between the inner peripheral face of the pump casing and an outer periphery of the impeller and made of a metal different from a metal of the pump casing; and
   an annular layer formed between the pump casing and the sleeve and made of a material that decreases electrolytic corrosion or oxidation of the pump casing or the sleeve.

2. The water jet pump of the jet-propulsion watercraft, according to claim 1, wherein the annular layer is made of a material having an ionization tendency more than an ionization tendency of a material of the pump casing or the sleeve.

3. The water jet pump of the jet-propulsion watercraft, according to claim 1, wherein the annular layer is made of a non-conductive material.

4. The water jet pump of the jet-propulsion watercraft according to claim 1, wherein the annular layer is coated over a surface of the sleeve.

5. The water jet pump of the jet-propulsion watercraft according to claim 4, wherein the annular layer is coated over an outer peripheral face and an end face of the sleeve, for isolating the pump casing from the sleeve.

6. A jet-propulsion watercraft comprising:
   a water jet pump including an outlet port, wherein the water jet pump pressurizes and accelerates water taken in from outside the watercraft and ejecting the water from the outlet port to propel the watercraft as a reaction of the ejecting water; and
   an engine for driving the water jet pump, wherein the water jet pump includes:
   a pump casing having a cylindrical inner peripheral face;
   an impeller supported in the pump casing coaxially with the inner peripheral face of the pump casing and rotatably driven by the engine; and
   a cylindrical sleeve provided between the inner peripheral face of the pump casing and an outer periphery of the impeller and made of a metal different from a metal of the pump casing; and
   an annular layer formed between the pump casing and the sleeve and made of a material that decreases electrolytic corrosion or oxidation of the pump casing or the sleeve.

7. The jet-propulsion watercraft according to claim 6, wherein the annular layer is made of a material having an ionization tendency more than a material of an ionization tendency of the sleeve.

8. The jet-propulsion watercraft according to claim 6, wherein the annular layer is made of a non-conductive material.

9. The jet-propulsion watercraft according to claim 6, wherein the annular layer is coated over a surface of the sleeve.

10. The jet-propulsion watercraft according to claim 9, wherein the annular layer is coated over an outer peripheral face and an end face of the sleeve, for isolating the pump casing from the sleeve.

* * * * *